(12) United States Patent
Saar

(10) Patent No.: US 8,044,636 B2
(45) Date of Patent: Oct. 25, 2011

(54) BATTERY OPERATED LED LAMP AND CONTROL

(75) Inventor: David A. Saar, Titusville, NJ (US)

(73) Assignee: PrincetonTectonics, Inc., Bordentown, NJ (US)

( * ) Notice: Subject to any disclaimer, the term of this patent is extended or adjusted under 35 U.S.C. 154(b) by 366 days.

(21) Appl. No.: 12/236,603

(22) Filed: Sep. 24, 2008

(65) Prior Publication Data

US 2009/0079398 A1 Mar. 26, 2009

Related U.S. Application Data

(60) Provisional application No. 60/995,205, filed on Sep. 25, 2007.

(51) Int. Cl.
*H02J 7/00* (2006.01)
*H02J 7/02* (2006.01)

(52) U.S. Cl. ........ 320/116; 320/118; 320/119; 320/122; 320/111

(58) Field of Classification Search .................. 320/114, 320/116
See application file for complete search history.

(56) References Cited

U.S. PATENT DOCUMENTS

| | | | |
|---|---|---|---|
| 2003/0126480 A1* | 7/2003 | Song | 713/300 |
| 2006/0214630 A1* | 9/2006 | Huang | 320/112 |
| 2007/0253188 A1* | 11/2007 | Klipstein et al. | 362/105 |
| 2009/0021210 A1* | 1/2009 | Korall et al. | 320/101 |

* cited by examiner

*Primary Examiner* — Edward Tso
*Assistant Examiner* — Ahmed Omar
(74) *Attorney, Agent, or Firm* — Howson & Howson LLP

(57) ABSTRACT

An LED lamp adapted for use as a bicycle light includes a lamp/switch module and a power supply/control module. The control includes a microcontroller that performs both light operating functions and battery charging control functions. A low battery warning is provided as a non-repeating, short sequence of flashes of the lamp.

3 Claims, 3 Drawing Sheets

BATTERY OPERATED LED LAMP AND CONTROL

CROSS-REFERENCE TO RELATED APPLICATION

This application claims priority from U.S. provisional patent application No. 60/995,205, the entire disclosure of which is hereby incorporate by reference.

FIELD OF THE INVENTION

This invention relates to battery operated LED lamps, and more particularly to a high intensity, battery operated LED lamp, suitable for use as a bicycle light.

BACKGROUND OF THE INVENTION

Typical battery-powered bicycle headlamps have utilized incandescent lamps, although, with the introduction of high-intensity light emitting diodes (LEDs) efforts have been made to utilize LEDs in bicycle headlamps. A problem with bicycle headlamps, including LED headlamps, is that the beam intensity gradually diminishes as the battery drains. The beam intensity can gradually diminish to a very low level before the user is consciously aware that a dangerous condition has arisen.

In the case of an LED headlamp, it is desirable to provide for selectable power levels in order to conserve power and prolong battery life. Selection of power levels is preferably accomplished electronically by operating an LED, or a bank of LEDs, by current pulses, and varying the duty cycle of the pulses. Control of the LED or LED bank, therefore requires an electronic control circuit.

Lithium ion (Li-ion) power supplies are a reliable energy source for bicycle lights because they are reliable, they are rechargeable, they have a high power to weight ratio, and they have a long life, if operated properly. Control of the charging and operation of a Li-ion power supply is also preferably accomplished by means of an electronic control circuit that prevents excessive discharge, prevents overcharging, and, in the case of a Li-ion battery, maintains the cell voltages in balance.

SUMMARY OF THE INVENTION

This invention provides a light weight, versatile, Li-ion powered LED lamp that maintains a nearly constant illumination level, provides an automatic warning when the power source is approaching a discharged condition, and utilizes a single microcontroller to control LED operation as well as power supply charging functions.

More particularly, in a battery operated LED lamp and control in accordance with the invention comprises a light source comprising at least one light-emitting diode, a manually operable switch, an electrochemical source of direct current, and a control circuit connectable to the light source, the switch, and the direct current source. The control circuit includes a microcontroller, and is connectable to deliver operating current from the direct current source to the light source under the control of the microcontroller to operate the light source.

In accordance with a first aspect of the invention, the microcontroller is connected to sense the level of charge in the direct current source while the light source is being operated, and is responsive to a predetermined level of charge below a full charge, to effect multiple, sequential, interruptions in the delivery of operating current to the light source for a limited time interval. The interruptions occur at a rate sufficient to cause a visually perceptible flashing off and on of the light source, thereby providing a visual indication of a low level of charge in the direct current source. The user can then switch to a fresh power source, or take other appropriate measures.

In accordance with another aspect of the invention, the control circuit, which is connectable to the light source, is alternatively connectable to deliver charging current from an external supply to the direct current source. The microcontroller is programmed to effect delivery, by the control circuit, of pulses of current to the light source, at different duty cycles in response to successive operations of the switch. The microcontroller is also programmed to monitor the voltage across the direct current source, and to deliver a charging current from the external supply to the direct current source at a constant level when the monitored voltage is below a predetermined limit, and to regulate the charging current delivered from the external supply to the direct current source when the monitored voltage rises above the predetermined limit so that the charging current decreases as the direct current source approaches a full charge.

In accordance with still another aspect of the invention, the direct current source is a battery composed of two electrochemical cells connected in series, and the control circuit is connected to both of the electrochemical cells to monitor the difference in the voltage of the cells. The microcontroller is programmed to effect delivery, by the control circuit, of pulses of current to the light source, at different duty cycles in response to successive operations of the switch. The control circuit also including a resistance associated with each cell, the resistance being connectable across its associated cell, and an electronic switch circuit, responsive to the microcontroller during charging, for selectably connecting one or the other of these resistances into shunt relationship with its associated cell to apply a load thereto. The microcontroller is also programmed to cause the electronic switch circuit to switch a resistance into shunt relationship with the cell having the higher voltage when a difference in excess of a predetermined voltage difference is detected by the control circuit, whereby the voltages of the cells are maintained at a substantially equal level.

Other details and advantages of the invention will be apparent from the following detailed description when read in conjunction with the drawings.

DETAILED DESCRIPTION OF THE PREFERRED EMBODIMENT

Figure 1:
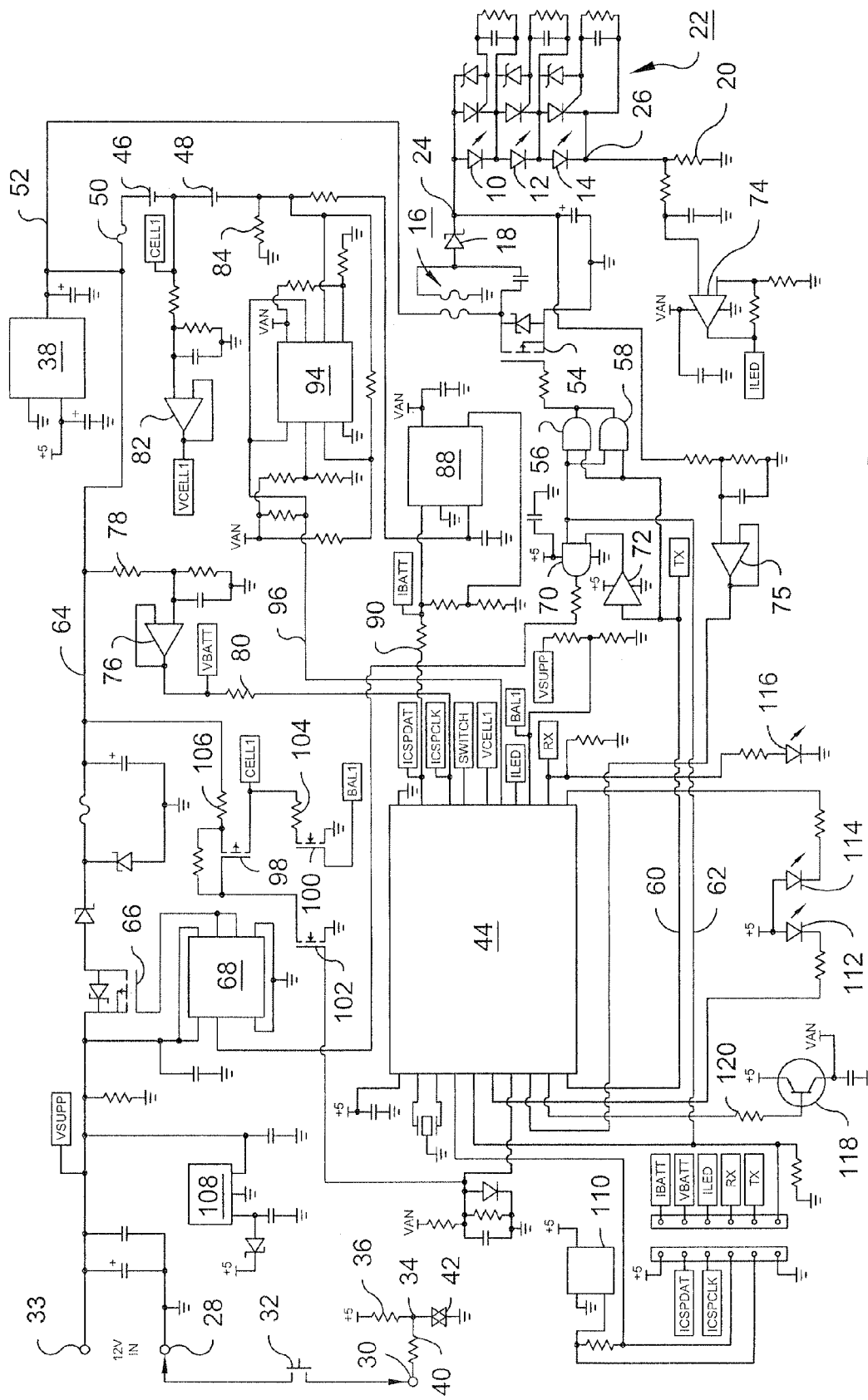
FIG. 1 is a schematic diagram of the battery powered LED lamp and control circuit according to the invention.

The LED lamp in the battery operated LED lamp and control according to the invention can be composed of one or more light emitting diodes. In the embodiment illustrated in FIG. 1, the lamp is composed of a string of three LEDs, 10, 12 and 14 connected in series. The LED string receives pulses of current from transformer 16 through Schottky diode 18 at one end of the LED string, and the opposite end is connected through a very small, 0.05Ω, resistor 20 to a circuit ground.

LEDs tend to become open circuited if they fail. In the case of an LED string, failure of a single LED can be prevented from causing failure of the entire string of LEDs by shunting each LED with a silicon controlled rectifier (SCR) having its gate connected so that it is triggered into conduction if the voltage across the corresponding LED becomes sufficiently high as a result of an open circuit condition. This objective is accomplished by circuit 22 associated with the LED string, the circuit comprising an array of SCRs, Zener diodes, capacitors and resistors as shown.

The LED lamp and the above-described failure avoidance circuitry are preferably housed in a lamp/switch module along with a normally open momentary switch, the lamp/switch module being connectable by a cable to a power supply/control module containing the control circuitry and the electrochemical DC power source. Preferably, a cable connector that is used to connect the lamp/switch module to the power supply/control module is also used, alternatively, to connect the power supply/control module to a charging power supply. Thus, the lamp/switch module and the charging power supply cannot be connected to the power supply/control module at the same time; the power supply/control module is either in a lamp operating mode or in a charging mode, but cannot be in both modes.

Terminals 24 and 26 are terminals on the power supply/control module that are connectable to the lamp/switch module. Terminal 28, which is a circuit ground terminal, and terminal 30 are terminals on the power supply that are also connectable to the lamp/switch module. Momentary, normally open, push button switch 32, which is part of the lamp/switch module, is connectable to terminals 28 and 30 when the lamp circuit 22 is connected to terminals 24 and 26, since terminals 24, 26, 28 and 30 are parts of the same cable connector on the power supply/control module.

The power supply control module also has a fifth terminal 33, which, with circuit ground terminal, is connectable to an external charging power supply when the lamp/switch module is not connected to the power supply/control module.

Junction 34, which is connected through a 4.7 KΩ resistor 36 to a five volt internal DC voltage supply derived from regulator 38, is normally at a +5 volt level. The switch 32, when closed, connects terminal 34 to the circuit ground through a 100Ω resistor 40, shunting a Zener transient voltage suppressor 42.

Junction 34 is connected to a "switch" terminal on microcontroller 44, which, in this embodiment, is a PIC16F690 microcontroller, manufactured by Microchip Technology Inc. of 2355 West Chandler Blvd, Chandler, Ariz. 85224.

The power supply/control module includes an electrochemical direct current source, which, in the embodiment shown in FIG. 1, is a lithium ion (Li-ion) battery comprising two cells 46 and 48 connected in series. The positive side of the battery is connected through fuse 50 to line 52, which leads to one end of the primary winding of transformer 16, the opposite end being switchable to the circuit ground by FET 54, which is controlled by AND gates 56 and 58. These AND gates receive inputs from the microcontroller 44 through lines 60 and 62. Pulses of current are delivered to the LED string from transformer 16 by operation of FET 54 under the control of the microcontroller.

The battery (cells 46 and 48) is also connected through fuse 50 to a charging line 64, which is connected to the external power supply terminal 33 through a transistor 66, controlled by an integrated circuit driver 68, controlled in turn by the microcontroller 44 through AND gate 70. AND gate 70 receives inputs from the microcontroller through line 62, and from line 60 through an inverter 72.

Current in the LED string is monitored by OP amp 74, which receives an input from the junction between LED 14 and resistor 20, and delivers an LED current terminal of the microcontroller 44.

The voltage across the LED string is monitored by OP amp 75, the output of which is connected to the microcontroller.

Battery voltage is monitored by the microcontroller through OP amp 76, an input of which is connected through a resistor 78 to line 64, and the output of which is connected through a resistor 80 to the microcontroller. The voltage of cell 48 is monitored by the microcontroller though OP amp 82, the output of which is connected to the microcontroller.

Battery charging current is monitored by sampling the voltage across a 0.02Ω resistor 84 through a resistor 86 connected to an OP amp 88. An output of OP amp 88, representing the battery charging current, is connected to the microcontroller 44 through resistor 90.

A comparator 94 also monitors the battery current by sampling the voltage across resistor 84, and is connected to the microcontroller through line 96. The purpose of this comparator is to detect spikes in the battery current, and to shut down the microcontroller if spikes occur.

FETs 98 and 100 are provided to maintain the cell voltages in balance during charging. As mentioned above, the microcontroller monitors both the overall battery voltage and the voltage of cell 48. The gate of FET 100 is connected to a microcontroller output. The gate of FET 98 is controlled from the microcontroller through another FET 102. The microcontroller detects difference between the cell voltages and causes one or the other of FETs 98 and 100 to switch a resistor across the cell having the higher voltage. Thus, if the voltage of cell 48 exceeds the voltage of cell 46 by an amount exceeding a predetermined amount, e.g., 25 millivolts, FET 100 is turned on, switching resistor 104 across cell 48. If the voltage of cell 46 exceeds the voltage of cell 48, FET 98 is turned on, switching resistor 106 across cell 46. In this way, the cells are maintained in balance during charging.

Other components of the control circuit include an integrated circuit voltage regulator 108, arranged to regulate the voltage in the charging line, a reset controller 110, that resets the microcontroller if the external power supply voltage is out of a predetermined range, and charge-indicating LEDs 112, 114 and 116, controlled by the microcontroller, for giving an indication of the state of charge of the battery. Transistor 118, the base of which is connected through a resistor 120 to the microcontroller, and the emitter of which is connected to the five volt DC supply provided by the battery through regulator 38, supplies operating current to various integrated circuits of the controller. When the lamp is off and the battery is charged, transistor 118 opens, turning off the integrated circuits to which it supplies operating current. The microcontroller also turns off its clock. As a result, current draw in the control is reduced to a low level.

Figure 2:
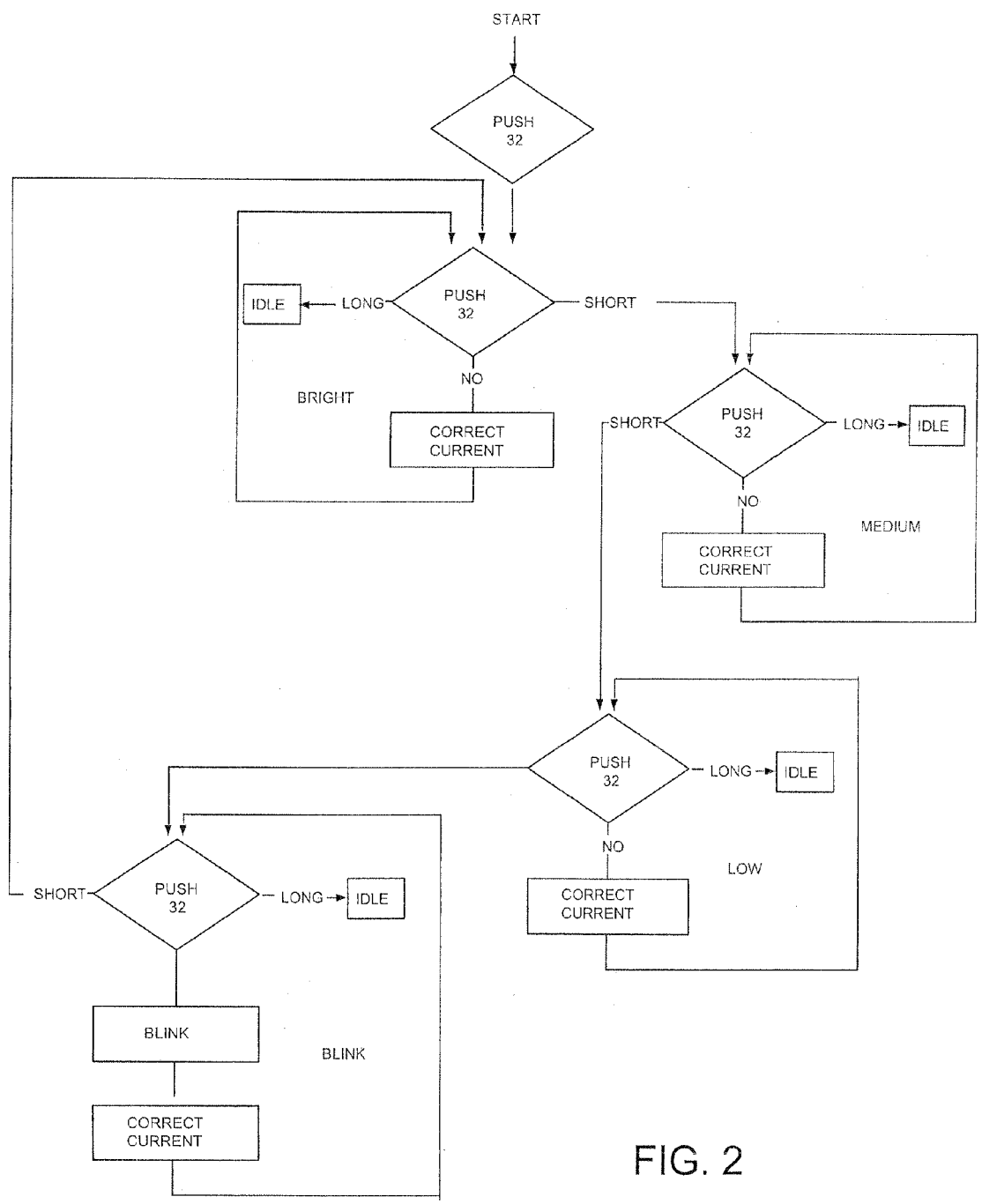
FIG. 2 is a flow diagram illustrating operation of the control circuit in the lighting mode.

The operation of the lamp/switch module, when connected to, and controlled by, the power supply/control module is depicted in FIG. 2. Initially, the system is in an idle mode. A first momentary depression of manually operable switch 32 activates the controller, and causes operating current, in the form of pulses, to be delivered to the LED string, causing the LEDs to light brightly. As the LEDs heat up, their current draw changes. LED current is monitored through OP amp 74 (FIG. 1) and regulated by the microcontroller, which adjusts the duty cycle of the pulses to maintain an appropriate average current for a substantially constant level of bright illumination by the LEDs.

If the momentary switch 32 is depressed a second time, for a short interval, e.g., less than one second, the microcontroller proceeds to a medium brightness mode, in which the pulse duty cycle is lower than in the case of the bright mode. Here again, the proper average current need to maintain a constant level of intermediate brightness is maintained by monitoring the LED current and controlling the pulse duty cycle.

A third depression of the momentary switch 32 for a short interval causes the system to proceed to a low brightness mode, in which the pulse duty cycle is still lower, but again regulated for a constant level of low brightness by monitoring the LED current.

A fourth depression of the momentary switch causes the system to proceed to a "blink" mode, in which the microcontroller causes the LED string to flash on and off in a predetermined pattern, e.g., six flashes per second, or three flashes in one-half second, followed by a one-half second dark interval. The microcontroller can, of course, be programmed to produce almost any desired flash pattern. Here again, the LED current is monitored to maintain a constant brightness level Still another depression of the momentary switch returns the system to the bright mode.

In any mode, holding the momentary switch 32 closed for a longer interval, e.g., for more than one second, will cause the microcontroller to proceed to its idle mode, turning off the lamp.

Figure 3:
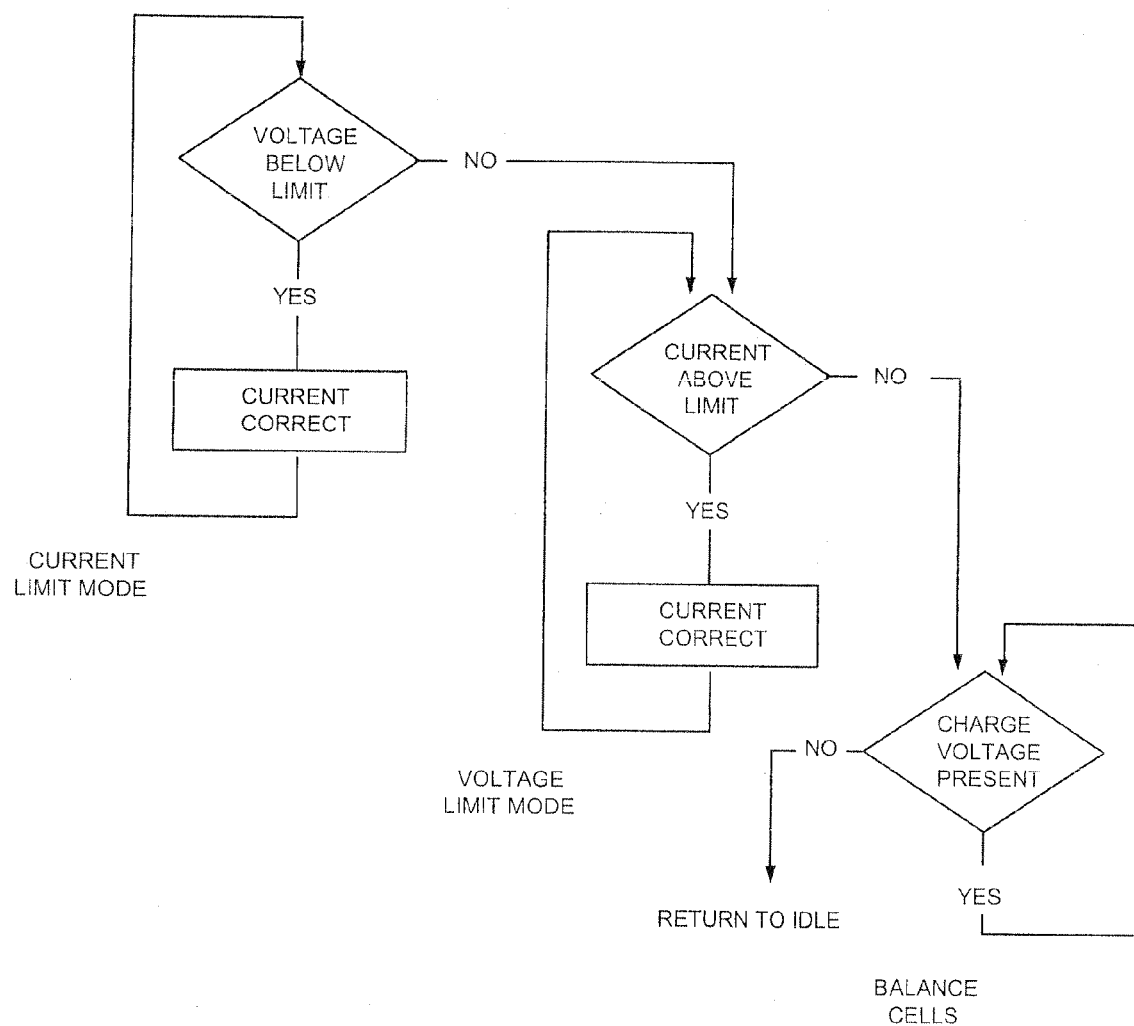
FIG. 3 is a flow diagram illustrating operation of the control circuit in the charging mode.

In charging, as depicted in FIG. 3, the battery voltage is monitored by the microcontroller through OP amp 76 (FIG. 1) and the battery current is simultaneously monitored through OP amp 88. If the voltage is below a preestablished limit, the microcontroller maintains a constant charging current in line 64 by controlling FET 66 through driver 68. However, when the battery voltage reaches the preestablished limit, the microcontroller shifts to a voltage limiting mode, in which the charging current, which is monitored through OP amp 88, is controlled so that the voltage does not exceed a preestablished limit. During charging in the voltage limiting mode, the voltage balance in the two cells of the battery is maintained as explained above by shunting resistor 104 across cell 48 or shunting resistor 106 across cell 46 under the control of the microcontroller. If the charging voltage is removed, e.g. by unplugging the external power supply (not shown) or by disconnecting the external power supply from terminals 28 and 32, the microcontroller returns the control to an idle condition.

The microcontroller monitors the battery voltage through OP amp 76 not only during charging, but also during operation of the lamp. It thereby monitors the level of charge in the battery, and can sense when the battery charge has reached the point where it can no longer maintain the required brightness level. The microcontroller can be set, to sense that the battery has reached a 25% charge level, for example. When the battery charge reaches this point, a flag is st in the microcontroller, and the lamp is flashed a predetermined number of times, e.g., four times to indicate to the user that the battery charge is low. In a typical low battery warning, the lamp is turned off for ¼ second, each second. After the prescribed number of flashes has occurred, another flag is set in the microcontroller, and the first-mentioned flag is cleared. This prevents further flashing until after the battery is charged. The lamp will continue to operate, but the battery should be recharged as soon as possible.

In summary it will be seen from the foregoing that the invention comprises a novel system in which a single programmed microcontroller is used both to control lamp operation and charging of the battery. The microcontroller establishes several modes of lamp operation in response to the operation of a simple momentary switch, monitors battery charge during lamp operation and produces a low battery warning, controls battery charging, and controls battery cell balance. Charging and lamp operation are simplified, and operation of the lamp while the battery is charging, are prevented, by providing for alternative connection of the power supply/control module to an external charging power supply and to the lamp/switch module using a common cable connector.

Various modifications can be made to the apparatus described. For example, the lamp can consist of a single LED, or two or more LEDs. The operating mode depicted in FIG. 2 can be varied, for example by providing for more or fewer brightness levels, by eliminating the blink mode, or by adding more flashing modes. The control can include various combinations of lamp operating features and battery charging features among those described, and can include additional features.

Still other modifications may be made to the apparatus and method described above without departing from the scope of the invention as defined in the following claims.

The invention claimed is:

1. A battery operated LED lamp and control comprising:
a light source comprising at least one light-emitting diode;
a manually operable switch;
an electrochemical source of direct current; and
a control circuit connectable to the light source, the switch, and the direct current source, the control circuit including a microcontroller;
the control circuit being connectable to deliver operating current from said direct current source to the light source under the control of the microcontroller to operate the light source;
the control circuit being alternatively connectable to deliver charging current from an external supply to the direct current source only when the control circuit is not connected to deliver operating current from said direct current source to the light source, in which:
the microcontroller is programmed to effect delivery, by the control circuit, of pulses of current to the light source, at different duty cycles in response to successive operations of the switch; and
the microcontroller is also programmed to monitor the voltage across the direct current source, and to deliver a charging current from the external supply to the direct current source at a constant level when said voltage is below a predetermined limit, and to regulate the charging current delivered from the external supply to the direct current source when said voltage rises above said predetermined limit so that the charging current decreases as the direct current source approaches a full charge.

2. A battery operated LED lamp and control comprising:
a light source comprising at least one light-emitting diode;
a manually operable switch;
an electrochemical source of direct current comprising two electrochemical cells connected in series; and
a control circuit connectable to the light source, the switch, and the direct current source, the control circuit including a microcontroller;
the control circuit being connectable to deliver operating current from said direct current source to the light source under the control of the microcontroller to operate the light source;
the control circuit also being connectable to deliver charging current from an external supply to the direct current source;

the control circuit being connected to both of said electrochemical cells to monitor the difference in the voltage of said cells;

the microcontroller being programmed to effect delivery, by the control circuit, of pulses of current to the light source, at different duty cycles in response to successive operations of the switch;

the control circuit also including a resistance associated with each said cell, the resistance being connectable across its associated cell, and an electronic switch circuit, responsive to the microcontroller during charging, for selectably connecting one or the other of said resistances into shunt relationship with its associated cell to apply a load thereto;

the microcontroller also being programmed to cause the electronic switch circuit to switch a resistance into shunt relationship with the cell having the higher voltage when a difference in excess of a predetermined voltage difference is detected by the control circuit, whereby the voltages of the cells are maintained at a substantially equal level.

3. A battery operated LED lamp and control according to claim 2, in which the control circuit is connectable to deliver charging current from an external supply to the direct current source only when the control circuit is not connected to deliver operating current from said direct current source to the light source.

* * * * *